3,050,160
SHEET METAL CONNECTION AND METHOD
FOR EFFECTING THE SAME
Cecil E. Chesser, Hebron, Ohio, assignor to Sears, Roebuck and Co., Chicago, Ill., a corporation of New York
Continuation of application Ser. No. 406,769, Jan. 28, 1954. This application Mar. 9, 1961, Ser. No. 94,457
8 Claims. (Cl. 189—36)

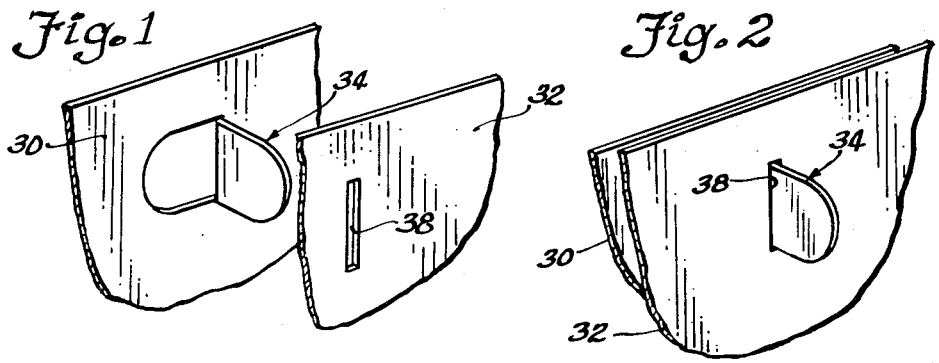
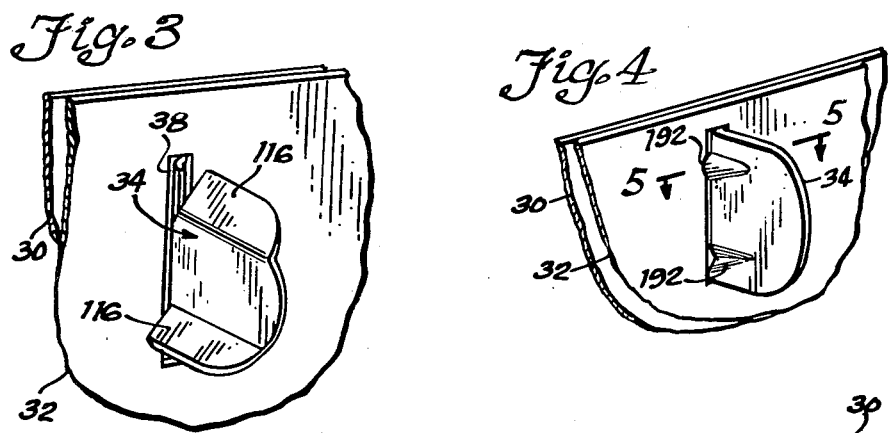
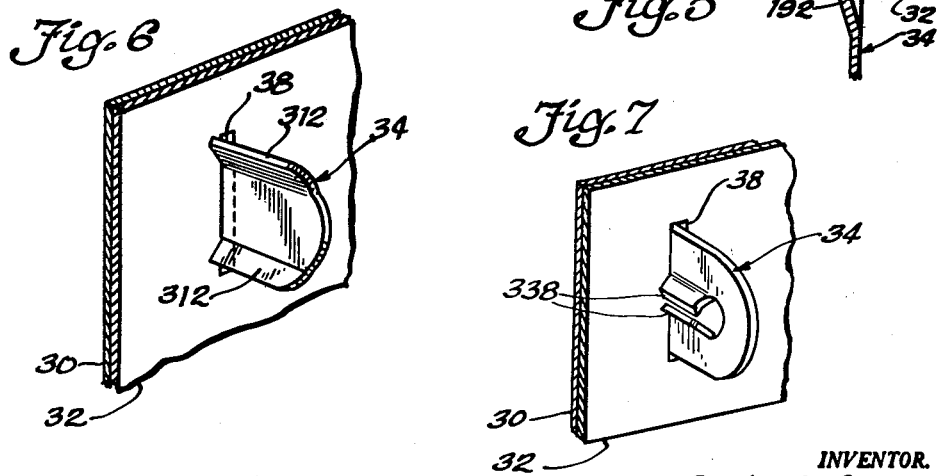

This application is in part a continuation of my pending application, Serial No. 406,769, filed January 28, 1954, now abandoned.

This invention relates to a connection in overlapped relation of sheet metal plates and is concerned more particularly with novel connections between the plates and with methods for effecting such securement.

An object of my invention is to provide a secure connection between a pair of parallel plates without the employment of welding or additional fastening means.

A further object is to provide a connected pair of parallel plates characterized in that an intermediate part of one plate is interlocked with an intermediate part of the other plate to hold the plates in firm, flatwise interengagement without the employment of welding or additional fastening means.

An additional object is to provide novel methods for locking together a pair of parallel plates as above noted.

According to my invention, an extremely tight juncture is accomplished whereby a pair of plates in contiguous parallel relation are joined by a tongue forming a portion of a first plate extending thorugh a slot of a second plate, a portion or portions of said tongue being sheared against the edge of the second plate by being projected out of the major plane of said tongue against said edge. Thus, an extremely tight, wedging lock is effected by said sheared portion in engagement with the outer face of the second plate, holding the two plates in firm parallel contact with each other.

Although my invention has many uses, it is especially applicable to kitchen ranges and other sheet metal cabinets. Normally, ranges embody a welded skeletal steel frame on which sheet metal plates are hung, as by spot welding, screws, etc. My invention completely eliminates the need for such a frame. Thus, there is a saving of material cost and weight, and considerable elimination of highly skilled labor. The result is a substantial saving in cost.

Since a wide variety of tools may be employed in the practice of my invention, none will be described.

Further objects and advantages of the invention will appear as the description proceeds.

The invention will be better understood upon reference to the following description and accompanying drawings, in which:

FIG. 1 is a fragmentary perspective view of a pair of plates about to be preliminarily assembled preparatory to their securement together;

FIG. 2 is a view similar to FIG. 1 but with the plates preliminarily assembled;

FIG. 3 is a perspective view showing the plates finally interlocked;

FIG. 4 shows the plates fastened together somewhat differently in accordance with my invention;

FIG. 5 is a sectional view taken as indicated by the line 5—5 in FIG. 4;

FIG. 6 is a perspective view of the plates locked together in still another manner according to my invention; and FIG. 7 is a perspective view of the plates locked together in another embodiment of my invention.

Referring now more particularly to the drawings, illustrating various embodiments of the invention, there is shown in FIG. 1 a pair of plates 30 and 32 adapted to be interlocked in parallel or flatwise interengagement.

A tongue 34, extending at a right angle to the remainder of the plate 30, is struck therefrom. The plate 32 has a slot 38 adapted to readily and freely receive the tongue 34. The plates 30 and 32 are preliminarily assembled in parallel relation as shown in FIG. 2 for assembly.

To complete the juncture after assembly as in FIG. 2, while the plates are forced together as tightly as possible the extremities of tongue 34 are bent out of the plane of the tongue, as seen in FIG. 3, to form leaf portions 116, 116, the base edges of these leaves being sheared against the adjacent edge of plate 32 to form a tight wedging engagement thereagainst. As shown, the leaves 116 are bent in opposite directions, but might be in the same direction. This action may be effected by a suitable tool grasping the tongue 34 and drawing the plates together while simultaneously shearing the leaves 116.

Another form of plate assembly is disclosed in FIGS. 4 and 5. In this form, the same plates 30 and 32 may be used and preliminarily assembled as above, with a tongue 34 of plate 30 extending through a slot in plate 32.

In this case a suitable tool grasps tongue 34 and, while pulling the plates tightly together, deforming elements are pressed against opposite sides of tongue 34 adjacent the outer face of plate 32 so as to produce oppositely extending deformations 192, the base edges of said deformations being sheared by the outer edge of plate 32. Here again the plates are tightly locked together by the wedging effect of the sheared deformations 192, as seen in FIGS. 4 and 5.

Another form of locked plate assembly is disclosed in FIG. 6.

The embodiment of FIG. 6 is substantially similar to that of FIGS. 1–3 except that leaves 312, 312 on opposite sides of tongue 34 are bent in the same direction from the plane of tongue 34, these leaves being sheared at their bases along the front edge of slot 38 represented by the dotted line 50, as in the other embodiments.

In the embodiment of FIG. 7 the plates 30 and 32 are locked together in a different construction embodying the same principle as the embodiments described above. In this case likewise a tongue 34 struck out at right angles from plate 30 extends through a slot 38 in plate 32 and, like the others, the plates are wedgingly locked together by the shearing of a portion of the tongue 34 against the outer surface of plate 32 while the plates are held tightly together.

In this case, a pair of opposed similar leaves 338, 338 are struck out from within the tongue 34, said leaves being on opposite sides of the median line of the tongue. When these leaves are pressed out from the tongue their base edges are sheared against the adjacent edge of plate 32 at slot 38. Obviously, there is the same wedging lock as in the other embodiments.

It will be obvious that such leaves, instead of having a common cleavage line and "hinge" lines on opposite sides thereof, could hinge about a common line and have cleavage lines spaced on opposite sides thereof, a reversal of the construction of FIG. 7.

It is apparent that in the illustrated modifications, the tongue comprises a base portion and a free end portion, the base portion being the portion secured to the plate out of which the tongue is struck and being that portion of the tongue below the line of shearing. The free end portion is the portion which extends outwardly from the outer surface of the slotted plate. The free end portion, in turn, comprises a main part and at least one deformed part. The main part is the part secured to the base portion. It is also apparent that the cut which severs the base portion from the deformed parts lies in the plane of the outer surface of the slotted plate.

Various changes coming within the spirit of my invention may suggest themselves to those skilled in the art. Hence I do not wish to be limited to the specific embodiments described or uses mentioned, but intend the same to be merely exemplary, the scope of my invention being limited only by the appended claims.

I claim:

1. A tight joint between two plates, the first of said plates having a flat portion and a slot through said flat portion, the second of said plates having a portion in tight abutting relationship with said flat portion, said flat portion having a surface remote from said second plate, means tightly pressing and positively locking said abutting portions together comprising a tongue extending from said abutting portion of said second plate and passing through said slot and extending normal to said flat portion, said tongue having a base portion and a free end portion, said free end portion comprising a main part and at least one deformed part, said main part being integral with said base portion and extending outwardly from said surface in a direction normal thereto, said deformed part being integral with said main part but being severed from said base part by a cut through a part of said tongue, said cut lying in the plane of said surface so that the edge of said base defined by said cut and the edge of said deformed part defined by said cut both lie in the plane of said surface, said deformed part being bent from said main part so that it is transverse to said surface and transverse to the plane of said main part, said cut edge of said deformed part being in tight edgewise engagement along substantially its entire length with said surface adjacent said slot whereby said plates are tightly joined together in abutting relationship.

2. A tight joint as recited in claim 1, wherein said abutting portion of said second plate is flat and parallel to the flat portion of said first plate.

3. A tight joint as recited in claim 2, wherein there are two deformed parts, said deformed parts being constituted by ears on the opposite side of the longitudinal median of said tongue.

4. A tight joint as recited in claim 3, wherein said ears extend in opposite directions from the plane of said main part.

5. A tight joint as recited in claim 2, wherein there are two deformed parts, said deformed parts being at the lateral extremities of said free end portion.

6. A tight joint as recited in claim 2, wherein said deformed part is spaced inwardly of the lateral edges of said free end portion.

7. A method of locking a pair of plates together in abutting relationship comprising the steps of providing a first plate having a flat portion and a slot extending through said flat portion, providing a second plate with a tongue extending therefrom, projecting said tongue through said slot until the plates are in abutting relationship, said tongue being normal to said slotted plate, drawing the plates into tight abutting relationship and bending a portion of the tongue beyond the slotted plate out of the plane of the tongue while maintaining another portion of the tongue normal to the slotted plate, and shearing said bent portion at the juncture of said tongue with the slotted plate by pressure against the adjacent edge of said slot so that the sheared edge of said bent portion will tightly engage the slotted plate.

8. A method as recited in claim 7, wherein the second plate has a flat portion parallel to the flat portion of said first plate, said tongue extending normal to said flat portion of said second plate.

References Cited in the file of this patent

UNITED STATES PATENTS

| | | |
|---|---|---|
| 1,821,668 | Ross | Sept. 1, 1931 |
| 2,246,343 | Bruehlman | June 17, 1941 |
| 2,689,630 | Drury | Sept. 21, 1954 |
| 2,811,702 | Narozny | Oct. 29, 1957 |